United States Patent
Schneider et al.

Patent Number: 5,516,853
Date of Patent: May 14, 1996

[54] PROCESS FOR THE PRODUCTION OF WATER-DILUTABLE BINDERS AND THEIR USE IN COATING COMPOSITIONS

[75] Inventors: Volker Schneider, Wachtendonk; Eberhard Arning, Kaarst; Harald Blum, Wachtendonk; Christian Wamprecht, Neuss, all of Germany

[73] Assignee: Bayer Aktiengesellschaft, Leverkusen, Germany

[21] Appl. No.: 424,923

[22] Filed: Apr. 19, 1995

[30] Foreign Application Priority Data

Apr. 29, 1994 [DE] Germany ............ 44 14 988.3

[51] Int. Cl.$^6$ ..................................... C08F 8/14
[52] U.S. Cl. ............ 525/384; 525/327.7; 525/327.8; 525/368; 525/369; 525/378; 525/385
[58] Field of Search ............................. 525/384, 385, 525/368, 369, 378

[56] References Cited

U.S. PATENT DOCUMENTS

| | | | |
|---|---|---|---|
| 3,634,052 | 1/1972 | Gee et al. | 44/62 |
| 4,229,331 | 10/1980 | Zückert | 260/20 |
| 4,654,050 | 3/1987 | Koch et al. | 525/384 |
| 4,670,516 | 6/1987 | Sackmann et al. | 525/327.6 |
| 4,814,102 | 3/1989 | Baur et al. | 252/174.24 |
| 4,956,421 | 9/1990 | Denzinger et al. | 525/385 |
| 4,980,412 | 12/1990 | Blum | 524/531 |
| 4,985,506 | 1/1991 | Blum et al. | 525/298 |
| 5,187,308 | 2/1993 | Pelah et al. | 560/202 |

FOREIGN PATENT DOCUMENTS

| | | |
|---|---|---|
| 1178490 | 1/1970 | United Kingdom. |
| 1511652 | 5/1978 | United Kingdom. |

*Primary Examiner*—Bernard Lipman
*Attorney, Agent, or Firm*—Joseph C. Gil; Thomas W. Roy

[57] ABSTRACT

The present invention relates to a process for the production of oxidatively crosslinkable, water-dilutable binders by a) forming a copolymer having intramolecular carboxylic anhydride groups by copolymerizing anhydride-functional compounds, other olefinically unsaturated monomers and 5 to 50% by weight, based on the weight of the olefinically unsaturated monomers used for the production of the copolymers a), of monomers which cannot be homopolymerized under the reaction conditions, b) subsequently reacting by ring-opening esterification at least 50% of the anhydride groups present in the copolymer with one or more unsaturated monohydric alcohols, c) reacting by ring-opening esterification up to 50% of the anhydride groups with monohydric saturated alcohols having a molecular weight of 32 to 200 either before, during or after step b), d) optionally reacting 1 to 70% of the carboxyl groups formed in steps b) and c) with organic epoxide compounds and e) neutralizing at least a portion of the carboxyl groups formed in steps b) and c).

The present invention also relates to the binders obtained by this process and to their use in water-dilutable lacquers and coating compositions.

6 Claims, No Drawings

PROCESS FOR THE PRODUCTION OF WATER-DILUTABLE BINDERS AND THEIR USE IN COATING COMPOSITIONS

BACKGROUND OF THE INVENTION

1. Field of the Invention

This invention relates to a process for the production of oxidatively crosslinkable, water-dilutable binders containing chemically incorporated carboxyl groups and olefinically unsaturated hydrocarbon radicals capable of oxidative drying, to the binders obtained by this process and to their use in coating compositions and sealing compositions.

2. Description of the Prior Art

Oxidatively drying, water-soluble binders based on alkyd resins are known (cf., for example, DE-PS 1,669,141, EP-A-0,002,488 and the literature cited therein). Coatings produced from such binders are normally distinguished by good optical and mechanical film properties. However, problems are caused by the relatively high vulnerability of such products to saponification in aqueous neutralized solution due to the basic polyester skeleton. Phase separation or rather sedimentation occurs in storage. There is a need for products having improved saponification stability and a shorter drying time.

EP-A-0,350,684 describes aqueous fatty-alcohol-modified copolymers of maleic acid anhydride as binders which are distinguished by rapid physical drying, form coatings having good optical film properties and, in addition, crosslink by oxidation. The disadvantage of these binders is that the copolymers used can only be produced using considerable quantities of inert solvents which generally remain in the water based coating compositions ultimately obtained. This runs contrary to the main purpose of water-based coating compositions, i.e., to minimize the content of volatile inert solvents.

Accordingly, an object of the present invention is to provide binders for water-based coating compositions which possess the advantages of the binders according to EP-A-0,350,684 without the disadvantage of a very high solvent content.

This object may be achieved by the process according to the invention which is described in detail hereinafter. The process according to the invention is based on the surprising discovery that when copolymerizable, but not homopolymerizable, monomers of the type described in detail hereinafter, which are liquid under the reaction conditions, are used, the use of inert solvents in the production of the copolymers can be reduced to a minimum so that the solvent content of the water-based coating compositions ultimately obtained is well below by weight.

SUMMARY OF THE INVENTION

The present invention relates to a process for the production of oxidatively crosslinkable, water-dilutable binders by a) forming a copolymer having intramolecular carboxylic anhydride groups, a weight average molecular weight ($M_w$) of 5,000 to 80,000 and an anhydride equivalent weight of 240 to 1,960 by copolymerizing in the presence of free radical initiators, copolymerizable anhydride-functional compounds, other olefinically unsaturated monomers and 5 to 50% by weight, based on the weight of the olefinically unsaturated monomers used for the production of the copolymers a), of monomers which cannot be homopolymerized under the reaction conditions, b) subsequently reacting by ring-opening esterification at least 50% of the anhydride groups present in the copolymer with one or more monohydric alcohols corresponding to the formula

R—OH wherein
R represents a mono- and/or polyolefinically unsaturated aliphatic hydrocarbon radical which has 8 to 30 carbon atoms and may contain ester and/or ether groups, c) reacting by ring-opening esterification up to 50% of the anhydride groups with monohydric saturated alcohols having a molecular weight of 32 to 200 either before, during or after step b), d) optionally reacting 1 to 70% of the carboxyl groups formed in steps b) and c) with organic epoxide compounds and e) neutralizing at least a portion of the carboxyl groups formed in steps b) and c).

The present invention also relates to the binders obtained by this process and to their use in water-dilutable lacquers and coating compositions.

DETAILED DESCRIPTION OF THE INVENTION

The copolymers produced in step a) of the process according to the invention have a weight average molecular weight ($M_w$, determined by gel permeation chromatography using polystyrene as standard) of 5,000 to 80,000, preferably 10,000 to 50,000, and an anhydride equivalent weight of 240 to 1,960, preferably 320 to 980. "Anhydride equivalent weight" means the weight in grams which corresponds to 1 mole of copolymerized intramolecular anhydride groups.

The production of the copolymers in step a) is carried out by the radically-initiated polymerization of olefinically unsaturated intramolecular dicarboxylic anhydrides with other olefinically unsaturated monomers in the presence of non-anhydride-functional unsaturated compounds which are copolymerizable with the other monomers, but are not homopolymerizable under the reaction conditions used to produce copolymers a). "Not homopolymerizable under the reaction conditions" means that under reaction conditions (i.e., same reaction time, same reaction temperature, same initiator, same initiator concentration, same concentration in any inert solvent used) sufficient to react at least 95% by weight of the monomer mixture to form copolymers, only at most 20% by weight of the "non-homopolymerizable" compounds themselves react in the absence of the other monomers to form homopolymers.

The monomer mixture for the copolymerization reaction contains i) 5 to 40 parts by weight of copolymerizable dicarboxylic anhydrides, such as taconic anhydride or maleic anhydride, preferably maleic anhydride, ii) 45 to 95 parts by weight of monomers having a molecular weight of 58 to 170 selected from aromatic vinyl compounds, aromatic isopropenyl compounds, vinyl esters, vinyl ethers, methacrylates containing 1 to 6 carbon atoms in the alcohol component and mixtures of such monomers, iii) 0 to 50 parts by weight of monomers selected from acrylates containing 1 to 18 carbon atoms in the alcohol component, methacrylates containing 7 to 18 carbon atoms in the alcohol component and mixtures of such monomers and iv) 5 to 50 parts by weight of non-anhydride-functional monomers which cannot be homopolymerized under the reaction conditions, wherein component iv) is present in an amount of 5 to 50, preferably 10 to 25% by weight, based on the weight of the monomers. Inert solvents such as methoxypropyl acetate, xylene, toluene, butyl acetate, solvent naphtha, dimethyl diglycol, dimethyl propylene glycol, diisobutyl ketone and mixtures of such solvents may optionally be used in quantities of up to 15% by weight, based on total weight of the reaction mixture.

Suitable monomers from group ii) include styrene, α-methyl styrene, vinyl toluene, styrenes substituted by $C_{1-4}$ alkyl groups at the aromatic ring, vinyl acetate, vinyl propionate, vinyl butyrate, ethylvinyl ether, butylvinyl ether, methyl methacrylate, ethyl methacrylate, n-butyl methacrylate, isobutyl methacrylate, n-hexyl methacrylate or cyclohexyl methacrylate.

Suitable monomers from group iii) include ethyl acrylate, n-butyl acrylate, isobutyl acrylate, n-propyl acrylate, n-pentyl acrylate, benzyl acrylate, stearyl acrylate, cyclohexyl acrylate, n-octyl methacrylate, 2ethylhexyl methacrylate, lauryl methacrylate, capryl methacrylate or stearyl methacrylate.

Suitable non-homopolymerizable compounds from group iv) include mono- or dialkyl esters of α,β-unsaturated dicarboxylic acids containing 1 to 20 carbon atoms in the alkyl groups. Particularly preferred representatives of these mono- or dialkyl esters are fumaric acid and maleic acid dialkyl esters containing 1 to 20, preferably 1 to 8 and more preferably 1 to 6 carbon atoms in the alkyl groups, such as for example dimethyl maleate, dimethyl fumarate, diethyl maleate, diethyl fumarate, dibutyl maleate, dibutyl fumarate and dicyclohexyl fumarate either individually or in admixture.

The following monomer mixtures are preferably used for the production of the copolymers in step a) of the process according to the invention:

i) 10 to 30% by weight of maleic anhydride, ii) 65 to 90% by weight of styrene, vinyl toluene, methyl methacrylate, n-butyl methacrylate, isobutyl methacrylate, n-hexyl methacrylate and cyclohexyl methacrylate, iii) 0 to 25% by weight of n-butyl acrylate, 2-ethylhexyl acrylate, lauryl acrylate, stearyl acrylate, 2-phenylethyl acrylate, 2-ethylhexyl methacrylate, stearyl methacrylate, lauryl methacrylate and capryl methacrylate and iv) 10 to 25% by weight of dimethyl maleate, dimethyl fumarate, diethyl maleate, diethyl fumarate, dibutyl maleate, dibutyl fumarate and dicyclohexyl fumarate, wherein the percentages add up to 100.

As can be seen from this list of examples, the term "alkyl group" also includes cycloalkyl groups.

The copolymers are produced by a radical-initiated copolymerization of monomer mixtures i) to iii) in the presence of compounds of group iv).

Suitable initiators, which are used in quantities of 0.5 to 10% by weight, include organic peroxides such as dibenzoyl peroxide, ditert.butyl peroxide, tert. butylperoxy-2-ethyl hexanoate (tert. butyl peroctoate) or didecanoyl peroxide and azo compounds such as 2,2'-azoisobutyronitrile. To obtain the required molecular weight, regulators (such as n-dodecyl mercaptan) may also be used in quantities of 0.01 to 5% by weight. The copolymerization reaction is carried out in the presence of 5 to 50%, preferably 10 to 25%, of the monomers from group iv) by initially introducing the monomers from group iv), heating them to the required reaction temperature, which is generally of 80 to 170° C., and then adding the remaining monomers and the initiator over a period of 3 to 8 hours.

In step b) of the process according to the invention, at least 50%, preferably at least 85% of the anhydride of the copolymers thus produced are reacted in step b) with monohydroxy functional compounds, R—OH, capable of oxidative drying such that the anhydride groups are converted into semiesters by ring-opening esterification and up to 50%, preferably up to 15%, of the anhydride groups are optionally converted into semiesters by reaction with low molecular weight, saturated monohydric alcohols before, during and/or after the reaction with compounds capable of oxidative drying.

The monohydric alcohols, R—OH, to be used in step b) of the process according to the invention are compounds which may optionally contain ether and/or ester groups and correspond to the above-mentioned definition of R. They are preferably monohydric alcohols, R—OH, wherein R is a mono- or polyolefinically unsaturated aliphatic hydrocarbon radical containing 14 to 18 carbon atoms or the residue obtained by removing the hydroxyl group from hydroxyalkyl esters, containing a total of up to 30 carbon atoms, of mono- or polyunsaturated monocarboxylic acids. These hydroxyalkyl esters may also contain ether oxygen atoms in the hydroxyalkyl groups.

Suitable alcohols, R—OH, include octadienol, lauroleic alcohol, oleyl alcohol, linoleyl alcohol, linolenyl alcohol, elaidyl alcohol, gadoleyl alcohol, arachidonic alcohol, erucic alcohol, clupanodonic alcohol and mixtures of these alcohols.

Preferred alcohols, R—OH, are the fatty alcohol mixtures obtained from natural oils (for example soybean oil or linseed oil) by transesterification and hydrogenation, such as Ocenol 110/130 or Ocenol 150/170 (commercial products of Henkel KGaA).

Suitable hydroxy-functional esters of unsaturated fatty acids include ethoxylated or propoxylated soybean oil, tall oil, peanut oil or safflower oil fatty acid, and mixtures thereof.

Mixtures of any of the preceding olefinically unsaturated monohydric alcohols may be used in step b) of the process according to the invention.

The semiester-forming reaction is normally carried out after the production of the copolymers by adding the alcohol or the alcohol mixture to the copolymer and reacting the resulting mixture for 2 to 10 hours at 100° to 160° C. or until the overall acid value becomes constant.

These unsaturated alcohols are used in such quantities in step b) of the process according to the invention such that at least 50%, preferably at least 85%, of the anhydride groups present in the copolymers of step a) are converted into semiester groups by ring-opening esterification, i.e. the molar ratio of anhydride groups to hydroxyl groups of the unsaturated alcohols in step b) is generally from 1:0.5 to 1:1 and preferably from 1:0.85 to 1:1. After step b) of the process according to the invention has been carried out, 15 to 50% by weight, preferably 20 to 40% by weight, of incorporated structural units corresponding to the formula, —O—R, are present in the modified copolymers.

To guarantee the water dilutability of the resulting oxidatively drying binders, the carboxyl groups present are at least partly converted into carboxylate groups by neutralization with a suitable base.

Aqueous inorganic bases such as sodium hydroxide, potassium hydroxide or ammonia may be used for neutralization. Also suitable are organic amines such as triethylamine, diethanolamine, methyl diethanolamine, dimethyl ethanolamine, dimethyl isopropanolamine, diethyl ethanolamine, 2-amino-2-methyl-1-propanol and mixtures of these and other neutralizing agents. The neutralization step may be carried out by the heating a mixture of water and neutralizing agent is to 40° to 80° C. and stirring in the hot resin melt or solution. The neutralizing agent, which may optionally be diluted with water, may also be directly added to the resin solution and the neutralized resin solution may then be adjusted to the required solids content by addition of water. In the neutralization reaction up to 100%, preferably 20 to 80%, of the carboxyl groups present are converted by neutralization into carboxylate groups.

In the process according to the invention up to 50%, preferably up to 15%, of the anhydride groups present in the copolymers from step a) are reacted with monohydric saturated alcohols by ring-opening esterification. This reaction generally takes place in exactly the same way as the reaction with the unsaturated monohydric alcohols, R—OH, and may be carried out before, during or after the reaction with the unsaturated alcohols.

This reaction is preferably carried out after the reaction with the unsaturated alcohols in step b) such that at least 95%, preferably 100%, of the anhydride groups remaining after the modification with the unsaturated alcohols are converted into semiester groups by ring-opening esterification. To obtain a complete reaction, it is even possible to use an excess of low molecular weight monohydric alcohols. Accordingly, the equivalent ratio of the hydroxyl groups of the monohydric alcohols (alcohols capable of oxidative drying + low molecular weight, monohydric saturated alcohols) to anhydride groups is 1:1 to 1.25:1.

Suitable monohydric, saturated alcohols are those having molecular weights of 32 to 200, such as methanol, ethanol, propanol, n-butanol, n-pentanol, n-hexanol, cyclohexanol, 2-ethylhexanol, methyl glycol, ethyl glycol, butyl glycol, methoxypropanol, ethoxypropanol, butoxypropanol, methyl diglycol, ethyl diglycol, butyl diglycol, glycolic acid methyl ester, glycolic acid ethyl ester, lactic acid methyl ester and mixtures of these alcohols.

In another embodiment of the process according to the invention, which may be combined with the reaction with the low molecular weight, saturated monohydric alcohols, optionally 1 to 70%, preferably 5 to 50%, of the carboxyl groups present after the modification reaction with the monohydric alcohols are converted into ester groups by reaction with organic compounds containing epoxide groups.

Suitable organic compounds containing epoxide groups are those having a molecular weight of 44 to 400, e.g, monoepoxides such as ethylene oxide, propylene oxide, 1,2-epoxybutane, 1,2-epoxy-2-methylpropane, 2,3-epoxybutane, cyclohexene oxide and styrene oxide; epoxyfunctional ethers such as 1,2-epoxy-3-phenoxypropane, 1-allyloxy-2,3-epoxypropane, methyl glycidyl ether and tert. butyl glycidyl ether; epoxy-functional esters such as versatic acid glycidyl ester; and mixtures of these and other epoxides.

To accelerate the reaction between carboxyl groups and epoxide groups, known catalysts such as tetrabutyl ammonium bromide, benzyltriethyl ammonium chloride and tetraethyl ammonium chloride may be added.

The reaction is normally carried out over a period of 3 to 12 hours at 80° to 150° C. The oxidatively drying copolymers modified with epoxides may then be converted into water-dilutable resins as stated above by at least partially neutralizing the remaining carboxyl groups.

In the process according to the invention, the type and quantities of starting materials used and the degree of neutralization (i.e., the percentage of carboxyl groups which have been converted into carboxylate groups by neutralization) are selected such that 1,5 to 47% by weight, preferably 3 to 25% by weight of monomers iv) are incorporated in the binders according to the invention; 15 to 50% by weight, preferably 20 to 40% by weight of structural units —O—R are present; and the binders have a carboxyl group content of 10 to 250, preferably 80 to 200, milliequivalents per 100 g solids, of which 10 to 100%, preferably 20 to 80%, have been neutralized, i.e. converted into carboxylate groups, by reaction with a base. Accordingly, the above-mentioned percentages of the carboxyl group content relate both to the free unneutralized carboxyl groups and to the neutralized carboxyl groups, i.e., carboxylate groups.

Where aqueous neutralizing agents are used, the binders according to the invention are generally directly obtained in the form of aqueous dispersions. If desired, aqueous dispersions may be prepared in known manner after the neutralization reaction is carried out in the absence of water. To promote dilutability or dispersibility with water, small quantities (approximately 0.01 to 2%) of surfactants may be added.

The binders present in aqueous form, preferably in the form of a 20 to 50% by weight aqueous dispersion, may optionally contain small quantities of organic solvents (preferably less than 5% by weight, based on solids). The aqueous dispersions may be directly used, i.e. without any further additions, as lacquers for the production of clear coatings.

However, known additives, such as pigments, drying accelerators, antioxidants, antiskinning agents, antifoam agents, wetting agents, fillers, etc., may be added. Preferred drying accelerators are known siccatives, i.e., salts of (cyclo)aliphatic monocarboxylic acids containing 6 to 18 carbon atoms with metals such as cobalt, manganese, nickel, chromium, zinc, zirconium, aluminum, calcium, barium or lead. These siccatives may be incorporated in the resin melt, added during grinding of the lacquer or subsequently incorporated in the final lacquer or coating composition.

To form the coating compositions, pigments, additives and oxidatively drying copolymers are ground together in known manner in conventional mixing units such as sand mills, bead mills, ball mills or dissolvers to form ready-to-use coating compositions.

The resulting coating compositions preferably contain less than 5% of volatile organic compounds and preferably have solids contents of 30 to 60%.

The oxidatively drying copolymers may be used in or as aqueous air-drying coating compositions for plastics, metals, glass, wood, paper, cardbord and ceramics. Other potential applications include the use of the binders in printing inks for textiles or leather and in impregnating or reinforcing compositions for paper, textiles and leather.

The coating compositions may be applied by conventional methods, for example, by flood coating, dip coating, spray coating, spread coating, casting and roll coating.

The systems according to the invention are particularly suitable for application at room temperature. To accelerate drying, however, the coatings may also be subjected to forced drying at about 40° to 100° C.

In the following examples all parts and percentages are by weight and are based on the non-volatile solids unless otherwise specifically stated.

Example 1

88.2 g of dimethyl maleate and 53.1 g of methoxypropyl acetate were weighed into a 4 liter three-necked flask equipped with a stirrer, cooling and heating system and heated to 135° C. A mixture of 125.0 g of maleic anhydride, 100.0 g of styrene, 275.0 g of methyl methacrylate and 2.5 g of n-dodecyl mercaptan was then introduced over a period of 3 hours. Beginning at the same time, 32.8 g of tert.butyl peroctoate (70% in a hydrocarbon mixture) were added over a period of 4 hours. After stirring for 1 hour at 135° C., 0.7 g of tert.butyl peroctoate were added twice with an interval of 15 minutes in between, followed by stirring for another 2 hours. After the addition of 300.0 g of a fatty alcohol mixture (Ocenol 110/130), the reaction mixture was stirred for another 10 hours at 135° C. After cooling to 120° C., 13.8 g of ethanol, 49.0 g of methoxypropanol and 1.0 g of benzyltriethyl ammonium chloride were added and the reaction mixture was stirred for 3 hours. After cooling to 90° C., 88.0 g of the glycidyl ester of versatic acid (Cardura E 10, a product of Shell) were added and the reaction mixture was stirred at 90° C. until the overall acid value was constant. The resin melt obtained was dispersed for 4 hours at 60° C. with a mixture heated to 50° C. that contained 23.4 g of ammonia solution (23.5%) and 1,520.0 g of water. After the addition of 15.1 g of an antiskinning agent (Ascinin R conz., a product of Bayer AG), the dispersion was filtered.

The aqueous resin dispersion had a solids content of 35.7% and contained 2.3% of organic solvents. The percentage of copolymerized monomers from group iv) was 8.7%.

Example 2

88.2 g of dicyclohexyl fumarate and 53.1 g of methoxypropyl acetate were weighed into a 4 liter three-necked flask equipped with a stirrer, cooling and heating system and heated to 135° C. A mixture of 125.0 g of maleic anhydride, 100.0 g of styrene, 275.0 g of methyl methacrylate and 2.5 g of n-dodecyl mercaptan was then introduced over a period of 3 hours. Beginning at the same time, 32.8 g of tert.butyl peroctoate (70% in a hydrocarbon mixture) were added over a period of 4 hours. After stirring for 1 hour at 135° C., 0.7 g of tert.butyl peroctoate were added twice with an interval of 15 minutes in between, followed by stirring for another 2 hours. After the addition of 300.0 g of the fatty alcohol mixture from Example 1, the reaction mixture was stirred for another 10 hours at 135° C. After cooling to 120° C., 13.8 g of ethanol and 1.0 g of benzyltriethyl ammonium chloride were added and the reaction mixture was stirred for 3 hours. After cooling to 90° C., 88.0 g of the glycidyl ester of versatic acid from Example 1 were added and the reaction mixture was stirred at 90° C. until the overall acid value was constant. The resin melt obtained was dispersed for 4 hours at 60° C. with a mixture heated to 50° C. that contained 24.1 g of ammonia solution (22.9%) and 1,380.0 g of water. After addition of 15.1 g of the antiskinning agent from Example 1, the dispersion was filtered.

The aqueous resin dispersion had a solids content of 42.4% and contained 2.6% of organic solvents. The percentage of copolymerized monomers from group iv) was 8.7%.

Example 3

88.2 g of dicyclohexyl fumarate and 53.5 g of methoxypropyl acetate were weighed into a 4 liter three-necked flask equipped with a stirrer, cooling and heating system and heated to 150° C. A mixture of 125.0 g of maleic anhydride, 100.0 g of styrene, 275.0 g of methyl methacrylate and 2.5 g of n-dodecyl mercaptan was then introduced over a period of 3 hours. Beginning at the same time, 23.0 g of ditert.butyl peroxide were added over a period of 4 hours, followed by stirring for another 2 hours. After cooling to 135° C., 300.0 g of the fatty alcohol mixture from Example 1 were added and the reaction mixture was stirred for another 10 hours at 135° C. After cooling to 120° C., 13.8 g of ethanol and 1.0 g of benzyltriethyl ammonium chloride were added and the reaction mixture was stirred for 3 hours. After cooling to 90° C., 88.0 g of the glycidyl ester of versatic acid from Example 1 were added and the reaction mixture was stirred at 90° C. until the overall acid value was constant. The resin melt obtained was dispersed for 4 hours at 60° C. with a mixture heated to 50° C. of 24.1 g that contained ammonia solution (22.9%) and 1,430.0 g of water. After addition of 15.1 g of the antiskinning agent from Example 1, the dispersion was filtered.

The aqueous resin dispersion had a solids content of 39.6% and contained 2.6% of organic solvents. The percentage of copolymerized monomers from group iv) was 8.7%.

Comparison Example 428.6 g of xylene were weighed into a 4 liter three-necked flask equipped with a stirrer, cooling and heating System and heated to 135° C. A mixture of 250.0 g of maleic anhydride, 200.0 g of styrene and 550.0 g of methyl methacrylate was then introduced over a period of 3 hours. Beginning at the same time, 65.5 g of tert. butyl peroctoate (70% in a mixture of hydrocarbons) were added over a period of 4 hours. After stirring for 1 hour at 135° C., 1.4 g of tert.butyl peroctoate was added twice with a 15 minute interval in between, followed by stirring for another 2 hours. After addition of 600.0 g of the fatty alcohol mixture from Example 1, the reaction mixture was stirred for another 10 hours at 135° C. After cooling to 120° C., 13.8 g of ethanol, 99.5 g of methoxypropanol and 1.0 g of benzyltriethyl ammonium chloride were added and the reaction mixture was stirred for 3 hours. After cooling to 90° C., 176.0 g of the glycidyl ester of versatic acid from Example 1 were added and the reaction mixture was stirred at 90° C. until the overall acid value was constant. The resin melt obtained was dispersed for 4 hours at 60° C. with a mixture heated to 50° C. that contained 60.8 g of ammonia solution (22.9%) and 3,370.0 g of water. The xylene was then azeotropically distilled off and, after addition of 27.6 g of the antiskinning agent from Example 1, the dispersion was filtered.

The aqueous resin dispersion had a solids content of 41.3% and contained 2.2% of organic solvents.

Preparation of Coating Compositions 0.06% by weight of cobalt siccative (cobalt content, based on solid resin) was added to the dispersions of Examples 1–3 and the Comparison Example, which were then applied by knife coating in a wet film thickness of 180 m. The coating compositions dried in 60 minutes to form clear tack-free films with good optical properties. After drying for 7 days, the films were highly resistant to water and solvents.

|  | Ex. 1 | Ex. 2 | Ex. 3 | Comparison |
|---|---|---|---|---|
| Sand drying (mins.) | 30 | 20 | 30 | 20 |

-continued

|  | Ex. 1 | Ex. 2 | Ex. 3 | Comparison |
|---|---|---|---|---|
| Partial drying (mins.) | 45 | 30 | 40 | 35 |
| König pendulum hardness (secs.) after 7 days | 45 | 87 | 80 | 78 |
| Water resistance after 7 days[1)] | 3 | 1 | 2 | 3 |

[1)] 0 = satisfactory; 5 = coating detached

Comparison of Examples 1 to 3 according to the invention with the Comparison Example demonstrates that, although comparable lacquer properties and a comparable organic solvent content were achieved, the present invention eliminates the need for the distillation step to remove excess quantities of organic solvent.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of an oxidatively crosslinkable, water-dilutable binder which comprises
    a) forming a copolymer having intramolecular carboxylic anhydride groups, a weight average molecular weight ($M_w$) of 5,000 to 80,000 and an anhydride equivalent weight of 240 to 1,960 by copolymerizing in the presence of free radical initiators, copolymerizable anhydride-functional compounds, other olefinically unsaturated monomers and 5 to 50% by weight, based on the weight of the olefinically unsaturated monomers used for the production of the copolymers a), of monomers which cannot be homopolymerized under the reaction conditions and comprise a member selected from the group consisting of mono- and dialkyl esters of α,β-unsaturated dicarboxylic acids containing 1 to 20 carbon atoms in the alkyl groups,
    b) subsequently reacting by ring-opening esterification at least 50% of the anhydride groups present in the copolymer with one or more monohydric alcohols corresponding to the formula

R—OH wherein
    R represents a mono- and/or polyolefinically unsaturated aliphatic hydrocarbon radical which has 8 to 30 carbon atoms and may contain ester and/or ether groups,
    c) reacting by ring-opening esterification up to 50% of the anhydride groups with monohydric saturated alcohols having a molecular weight of 32 to 200 either before, during or after step b),
    d) optionally reacting 1 to 70% of the carboxyl groups formed in steps b) and c) with organic epoxide compounds and
    e) neutralizing at least a portion of the carboxyl groups formed in steps b) and c).

2. The process of claim 1 wherein said monomers which cannot be homopolymerized under the reaction conditions comprise alkyl esters of α,β-olefinically unsaturated dicarboxylic acids containing 1 to 8 carbon atoms in the alkyl radicals.

3. The process of claim 1 wherein said monomers which cannot be homopolymerized under the reaction conditions are present in an amount of 10 to 25% by weight, based on the weight of the olefinically unsaturated monomers used for the production of copolymers a), and comprise fumaric acid and/or maleic acid bis-alkyl esters containing 1 to 6 carbon atoms in the alkyl radicals.

4. The process of claim 1 which comprises reacting 1 to 70% of the carboxyl groups formed in steps b) and c) with compounds containing epoxide groups before step e).

5. The process of claim 2 which comprises reacting 1 to 70% of the carboxyl groups formed in steps b) and c) with compounds containing epoxide groups before step e).

6. The process of claim 3 which comprises reacting 1 to 70% of the carboxyl groups formed in steps b) and c) with compounds containing epoxide groups before step e).

* * * * *